United States Patent [19]

Sendyk et al.

[11] Patent Number: 5,353,348
[45] Date of Patent: Oct. 4, 1994

[54] DOUBLE ECHO CANCELLING SYSTEM

[75] Inventors: Andrzej Sendyk; Jahangir E. Austin, both of Calgary, Canada

[73] Assignee: JRC International, Inc., Ft. Worth, Tex.

[21] Appl. No.: 61,431

[22] Filed: May 14, 1993

[51] Int. Cl.$^5$ .......................................... H04M 9/08
[52] U.S. Cl. ............................ 379/410; 379/411; 379/388; 379/389; 379/390; 370/32.1
[58] Field of Search .............................. 379/406–407, 379/409–411, 388–392; 370/32.1

[56] References Cited

U.S. PATENT DOCUMENTS

| | | |
|---|---|---|
| 3,500,000 | 3/1970 | Kelly, Jr. et al. |
| 4,087,654 | 5/1978 | Mueller |
| 4,118,601 | 10/1978 | Yeap |
| 4,135,590 | 1/1979 | Gaulder |
| 4,184,048 | 1/1980 | Alcaide |
| 4,185,168 | 1/1980 | Graupe et al. |
| 4,225,754 | 9/1980 | Bernard et al. |
| 4,227,046 | 10/1980 | Nakajima et al. |
| 4,362,909 | 12/1982 | Snijders et al. |
| 4,363,935 | 12/1982 | Toya |
| 4,493,101 | 1/1985 | Muraoka et al. |
| 4,527,014 | 7/1985 | Styrna |
| 4,535,206 | 8/1985 | Falconer |
| 4,536,616 | 8/1985 | Kaire |
| 4,564,939 | 1/1986 | Hansen |
| 4,594,695 | 6/1986 | Garconnat et al. |
| 4,600,815 | 7/1986 | Horna |
| 4,629,829 | 12/1986 | Puhl et al. |
| 4,636,586 | 1/1987 | Schiff |
| 4,658,426 | 4/1987 | Chabries et al. |
| 4,677,677 | 6/1987 | Eriksson |
| 4,712,235 | 12/1987 | Jones, Jr. |
| 4,782,525 | 11/1988 | Sylvain et al. ........................ 379/410 |
| 4,845,746 | 7/1989 | Li ........................................ 379/411 |
| 5,050,160 | 9/1991 | Fuda ................................. 379/411 X |
| 5,099,472 | 3/1992 | Townsend et al. ............... 379/390 X |

Primary Examiner—James L. Dwyer
Assistant Examiner—Paul A. Fournier
Attorney, Agent, or Firm—Cesari and McKenna

[57] ABSTRACT

A double echo cancelling system includes comparators which monitor, respectively, "unmodified" signals from the near end or far end and "modified" signals from the other end. The unmodified signals are the signals received by the system and the modified signals are those signals which have been subjected to echo cancellation and attenuation. A comparator determines that a caller at one end is speaking if the associated unmodified signals exceed by more than a predetermined value the modified signals associated with the other end. The comparator which detects near end speech controls the adaptation of an associated adaptive filter and the operation of a cancellation monitor, which, in turn, controls the adaptation of the adaptive filter associated with the far end. When this comparator detects near end speech, it enables the cancellation monitor. The monitor compares the power of the unmodified far end signals with the power of the residue signals produced by an associated subtraction circuit, and enables adaptation of the associated adaptive filter if the residue signals exceed the unmodified signals by more than a predetermined amount. Otherwise, the monitor inhibits adaptation. Attenuation control circuitry uses the speech detection signals from both of the comparators to control the gain of near end and far end signal attenuators. If only one end is active, the controller increases the gain of the appropriate attenuator; if both ends are active simultaneously, it leaves the attenuators in their current states; and if neither end is active it decreases the gain of both attenuators.

7 Claims, 2 Drawing Sheets

DOUBLE ECHO CANCELLING SYSTEM

FIELD OF INVENTION

The invention relates generally to speaker telephones, or "hands-free," telephone terminals, and more particularly to systems for cancelling echoes from telephone conversations in cellular, land line and other systems.

BACKGROUND

A speaker, or hands-free, terminal includes a microphone and a loudspeaker, and enables a user to participate in a telephone conversation without the use of a handset. One problem with a hands-free terminal is a tendency for acoustic coupling between the microphone and the loudspeaker. The microphone picks up the speech which is being acoustically transmitted by the loudspeaker and transmits the speech back over the telephone line, as an echo, to the caller who is speaking at the remote, or "far" end. A hands-free telephone, like all telephones, also receives echoes of near end speech caused by reflections of speech signals from impedance mis-matches in telephone network circuitry. Such echoes return, via the loudspeaker, to the terminal user, who is at the "near" end.

To overcome this problem, terminals may include double echo cancelling systems. These systems include adaptive filters which produce, from incoming speech signals, replicas of the echoes. These systems then subtract the replicas, which are referred to as echo cancellation signals, from the incoming signals to "cancel" from them the included echoes. If the replica is not exactly the same as the echo, a residue of the echo remains.

The double echo cancelling systems include two adaptive filters, one associated with the microphone and one associated with the loudspeaker. The adaptive filters are controlled by servo circuits which, based on the residue signals, adjust the filter components until they mimic the acoustic paths of the associated echo signals.

The adaptive filter servo circuits must be controlled so that the adaptive filters cancel echoes and not direct speech signals. Accordingly, speech detectors are included in known echo cancelling systems to determine when "near" end or "far" end speech is present. When, for example, a "far end" speech detector detects speech, it disables the servo circuit of the adaptive filter that produces the echo cancellation signals which are subtracted from the incoming far end signals. This prevents the filter from adapting to the speech signals.

Meanwhile, the servo circuit of the adaptive filter that produces the echo cancellation signals that are subtracted from the incoming near end signals, that is, the signals produced by the microphone, is allowed to adjust that filter. The filter receives the far end speech signals and produces corresponding echo cancellation signals. These signals are then subtracted from the echo signals produced by the microphone. Any residue signals after subtraction are fed back to the servo circuit as error signals. The servo circuit responds to these error signals by adapting the filter to more closely approximate the associated echo path, so that it can produce an echo cancellation signal which reduces the echo to zero.

When the far end caller stops talking, the far end speech detector enables the servo circuit of the associated adaptive filter. This allows the servo circuit to adapt the filter to produce echo cancellation signals which replicate the echoes produced from the near end signals. When the "near end" speech detector detects speech, it disables the adaptation of the associated adaptive filter, so that the filter will not attempt to adapt to these speech signals.

In a prior system the speech detectors monitor the output signals from the subtraction circuits, i.e., the residue signals, to determine if speech is present. These detectors may interpret, as speech, included noise attributable to the adaptation of the associated adaptive filters. The speech detectors may thus enable the servo circuit of a filter which should be disabled, and thereby distort transmissions by cancelling speech signals.

These systems may also have problems during periods of "double talk," that is, when both the near end user and the far end caller are talking. With double talk, both of the speech detectors detect speech, and thus, both enable their associated adaptive filters. This promotes cancellation of the speech from both ends, which results in a disruption of the telephone conversation. Accordingly, what is needed is a control mechanism which responds appropriately to double talk.

The double echo cancellation systems may also include variable-gain attenuators, to attenuate the residue produced by the subtraction circuits. Known prior systems use the speech detectors to control the gain of the attenuators, where gain is defined herein as attenuation inversion. Accordingly, when a particular speech detector detects speech on a line, the detector either increases the gain of the attenuator associated with that line, which allows the speech signals to be transmitted at an increased power, or reduces the gain of the attenuator associated with the line over which the residue signal is transmitted, to reduce the power of that signal. Systems which control the attenuators with the speech detectors may have attenuation problems during double talk, when the system operates both of the attenuators simultaneously.

SUMMARY OF THE INVENTION

A double echo cancelling system incorporating the invention includes comparators which monitor both the "unmodified," signals from the near end microphone and the far end of the circuit and the signals which have been subjected to echo cancellation and attenuation, that is, the "modified" signals, to determine when speech is present. The comparator which detects near end speech compares the unmodified near end signals and the modified far end signals. The comparator which detects far end speech compares the unmodified far end signals and the modified near end signals. Each comparator determines that a caller at a particular end is speaking if the unmodified signals associated with that end exceed the modified signals associated with the other end by more than a predetermined value. By comparing modified and unmodified signals, when the modified signals are taken after attenuation, hysteresis is introduced, which prevents the unnecessary enabling of an adaptive filter.

The comparator which determines if speech is present at the near end controls the adaptation of the associated adaptive filter, disabling it when speech is present at the near end and enabling it when speech is not present. In a preferred embodiment, this comparator also controls the operation of a cancellation monitor, which, in turn, controls the operation of the adaptive filter associated with the far end. When this comparator detects near end speech, it enables the cancellation monitor. The monitor then compares the power of the unmodified signals from the far end with the power of the residue signals produced by the associated subtraction circuit. If the power of the residue signals exceeds a certain percentage of the power of the incoming signals, which indicates poor "cancellation," the monitor enables the adjustment of the associated adaptive filter. Otherwise, the monitor inhibits adaptation of the filter. Since the acoustic characteristics of the associated echo path, which is through the network, typically do not vary often during a telephone conversation, the filter remains "frozen" throughout much of the conversation. Accordingly, noise attributable to adaptation of the filter, which is otherwise included in the residue signal, is essentially eliminated. With cellular systems, for example, the characteristics of the network echo path may vary when the call is handed-off to a different base site. With land line systems, the characteristics of the echo path may remain constant for the duration of the call.

Attenuation control circuitry uses the speech detection signals from both of the comparators to control the gain of near end and far end signal attenuators, to respond appropriately to speech at the near end, the far end, both ends and neither end. If only one end is active, the controller increases the gain of the appropriate attenuator. If both ends are active simultaneously, the controller leaves the attenuators in their current states, so that they do not disrupt the conversation. Conversely, if neither end is active, the controller decreases the gain of both attenuators, decreasing the power of noise signals on the lines and ensuring the stability of the entire servo loop when the adaptive filter has no reference signal to which to adapt.

The adaptive filters use the modified signals as reference signals. The filters thus adapt to the same signals that are sent to network transmit circuitry and to the telephone loudspeaker, respectively. Accordingly, they can adapt quickly to cancel the echoes produced by these modified signals.

BRIEF DESCRIPTION OF THE DRAWINGS

The above and further advantages of the invention may be better understood by referring to the following description in conjunction with the accompanying drawings, in which.

DETAILED DESCRIPTION

Figure 1:
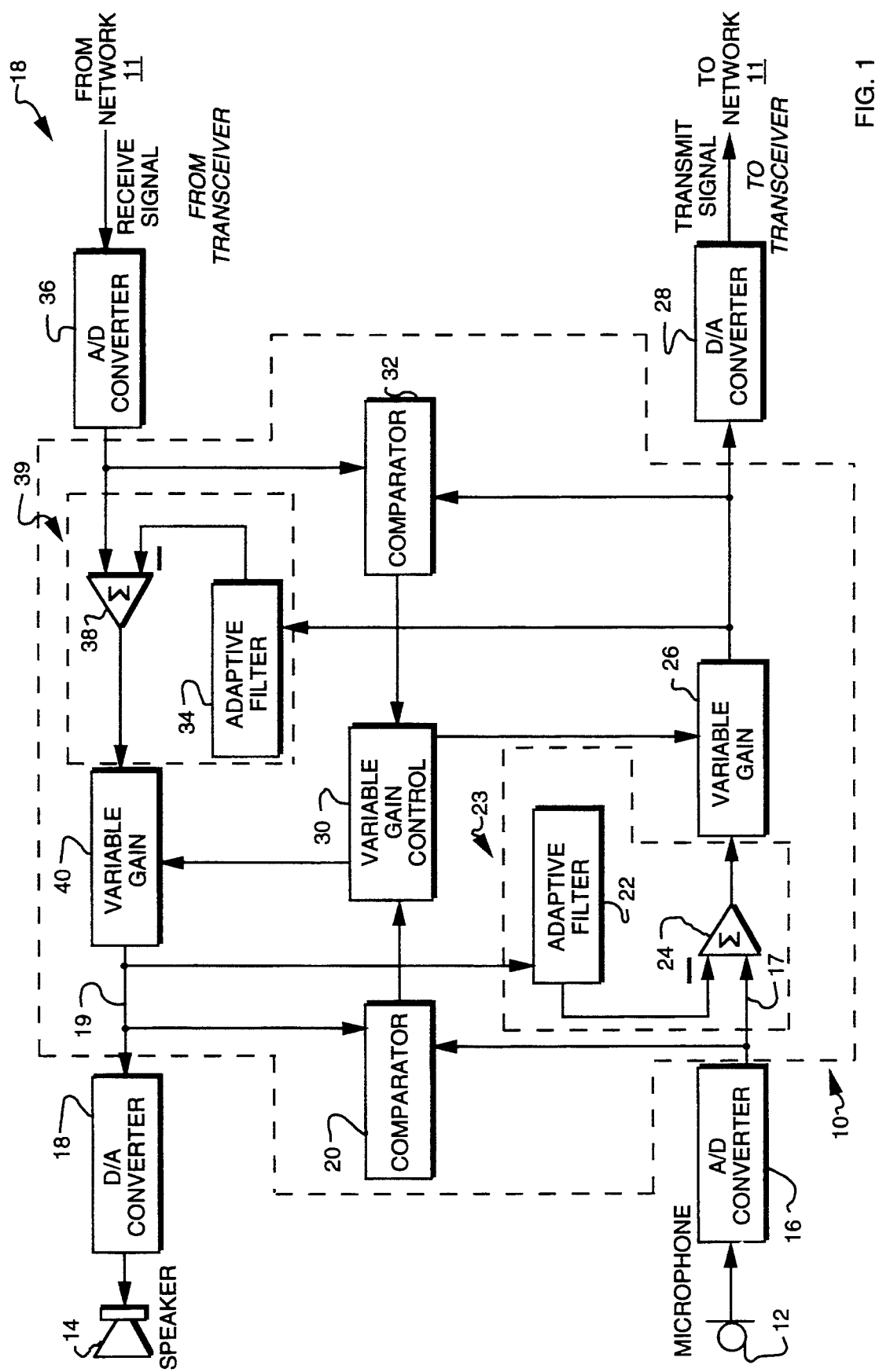
FIG. 1 is a block diagram of a double echo cancellation system which includes an attenuation controller.

FIG. 1 depicts a double echo cancellation system 10, for use with a hands-free telephone terminal 8 connected, by means of a telephone network generally referred to as 11, to a "far end" terminal. The telephone, or near end, terminal includes a microphone 12 and a loudspeaker 14. Echoes are produced by acoustic coupling between the loudspeaker 14 and the microphone 12 and/or by reflections of speech signals by network circuitry (not shown) with mis-matched impedances. Without the double echo cancellation system 10, echoes of far end speech would be transmitted back over the network to the remote, or far end, caller and echoes of near end speech would be acoustically transmitted to the near end user by the loudspeaker 14. The echoes disrupt conversation, particularly if there is much of a delay between the transmission of the speech and the return of the associated echo.

To overcome this problem, the double echo cancellation system 10 includes two cancellation nodes 23 and 39, which essentially manipulate received speech reference signals to produce replicas of the associated echoes and then subtract these replicas from the echoes to "cancel" them, that is, to reduce them to near zero. The double echo cancelling system may operate with digital or analog signals. The embodiment discussed below converts analog incoming signals to digital signals in converters 16 and 36 before removing the echoes. However, the techniques employed by this system are readily applicable to systems which use analog signals directly.

A comparator 20 monitors signals produced by the microphone and compares them with the signals on line 19, which are modified far end signals. The comparator 20 determines that the near end caller is speaking if the unmodified near end signals exceed the modified far end signals by more than a predetermined amount.

The near end signals are next applied to cancellation node 23, which includes an adaptive filter 22 and a subtraction circuit 24. The filter 22, as discussed in more detail below, approximates the acoustic path between the loudspeaker 14 and the microphone 12. The filter receives signals which are to be transmitted by the loudspeaker and produces replicas of the echoes associated with these signals. It then provides these replicas, which are the echo cancellation signals, to the subtraction circuit 24. The subtraction circuit 24 subtracts the echo cancellation signals from the near end signals and produces residue signals which are applied to a variable-gain attenuator 26. The attenuator attenuates the residue signal, as necessary, to reduce further the effects of the echo. The output signals from the attenuator, which are the modified near end signals, are then applied, as necessary, to a D/A converter 28, which converts them to analog signals for transmission over the network. The gain of attenuator 26 is controlled by attenuation controller 30, as discussed in more detail below.

The modified near end signals are also provided to comparator 32, which compares them with signals received over the network, that is, with the unmodified far end signals. The comparator 32 determines that the far end caller is speaking when it detects unmodified far end signals which exceed the modified signals by more than a predetermined amount. If the comparator determines that the far end caller is speaking, the comparator asserts a speech signal and supplies it to the attenuation controller 30, discussed below, and to the servo circuit of adaptive filter 34.

The unmodified far end signals are also supplied to the subtraction circuit 38 of cancellation node 39. The subtraction circuit 38 subtracts from these signals the echo cancellation signals provided to it by the adaptive filter 34. The subtraction of the echo cancellation signals, which are replicas of the echoes produced by network reflection of near end speech signals, "cancels" the echoes of near end speech from the far end signals. The residue signals produced by the subtraction circuit 38, which are remnants of the echoes, are applied to a variable-gain attenuator 40, which attenuates them, as necessary. The output signals from the attenuator 40, which are the modified far end signals, are applied to D/A converter 18, for conversion to analog signals. The loudspeaker 14 then acoustically transmits these signals to the near end user.

The adaptive filters 22 and 34 operate in the same manner. A servo circuit included in each of the adaptive filters controls the adaptation of the filter, using conventional techniques, such that the filter approximates the associated acoustic echo path. The adaptive filter 22 uses as a reference signal the modified far end signal on line 19, which is the signal that produces an echo through acoustic coupling between the loudspeaker 14 and the microphone 12. Accordingly, when the adaptive filter 22 filters this signal, it produces a corresponding echo cancellation signal which is a replica of the echo attributable to the loudspeaker's acoustic transmission and the microphone's pick up of that signal. When subtraction circuit 24 subtracts this echo cancellation signal from the signals produced by the microphone, the residue should be near zero. Similarly, adaptive filter 34 uses as its reference signal the modified near end signal, which is the signal transmitted by the telephone network 11.

The servo circuits receive the associated residue signals, as adaptive filter error signals. If the received error signal is greater than zero, the servo circuit continues to adapt the filter, so that the filter more closely mimics the characteristics of the echo path.

As discussed above, the enabling and disabling of the servo circuit which controls adaptation of the adaptive filter 22 is controlled by the comparator 20. When the comparator 20 determines that near end speech is present, it disables the servo circuit so that the adaptive filter does not adapt to the speech signals. When near end speech is not present, the controller allows the servo circuit to adapt the adaptive filter, so that it can mimic the associated echo path. Similarly, the servo circuit of adaptive filter 34 is inhibited when comparator 32 determines that far end speech is present, and otherwise allowed to adapt.

As discussed above, the attenuators 26 and 40 are controlled by the attenuator controller 30, which receives the speech detection signals from both of the comparators 20 and 32. If the attenuator controller 30 receives signals indicating far end speech and no near end speech, it reduces the gain of the attenuator 26, and sets to a maximum the gain of the attenuator 40. The system thus attenuates the echo signals produced by the microphone 12 and leaves unattenuated the signals to be transmitted by the loudspeaker 14. If the attenuator controller 30 receives signals indicating near end speech and no far end speech, the attenuator controller 30 reduces the gain of the attenuator 40, to reduce the echo signals, and sets to a maximum the gain of the attenuator 26.

During periods of double talk the attenuator controller 30 receives signals indicating speech at both the near end and the far end. In response to these signals the controller 30 leaves the attenuators 26 and 40 at their present gain levels, so as not to interfere with the conversation. If the comparators 20 and 32 determine that neither caller is speaking, the attenuator controller 30 reduces the gain of both attenuators 26 and 40, to reduce the effects of noise on the lines and to ensure the stability of operation of the adaptive filter servo circuits, when the filters have no reference signals.

Figure 2:
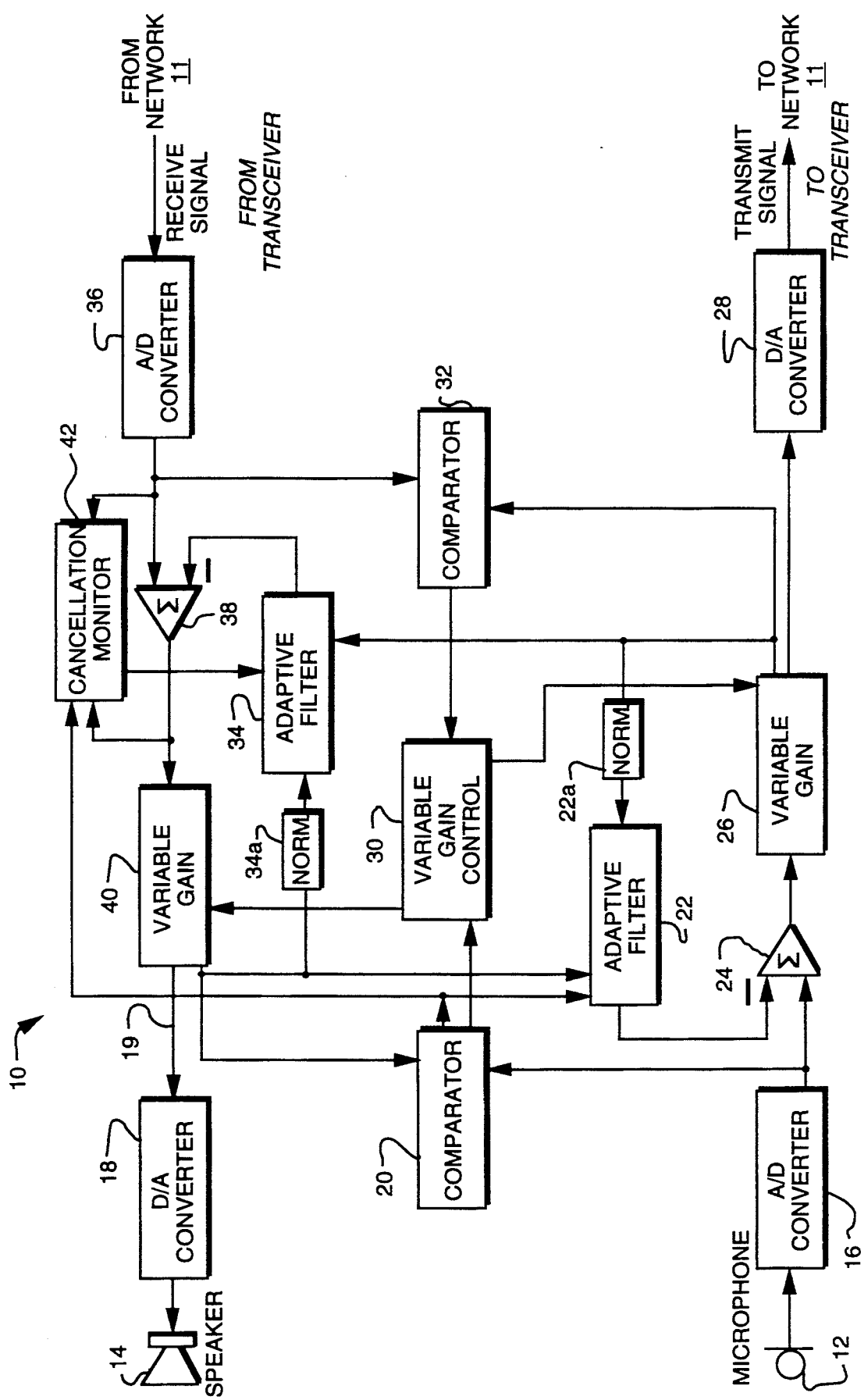
FIG. 2 is a block diagram of a double echo cancellation system which includes a cancellation monitor and is constructed in accordance with a preferred embodiment of the invention.

Referring now to FIG. 2, a preferred embodiment of the double echo canceller system is depicted in block diagram form. This system includes a cancellation monitor 42, which controls the operation of adaptive filter 34, and is, in turn, controlled by comparator 20. The remainder of the system operates as described above with reference to FIG. 1.

When the comparator 20 determines that the near end user is speaking, the comparator 20 enables the cancellation monitor 42. The monitor then compares the power of the unmodified far end signals and the power of the corresponding residue signals produced by subtraction circuit 38, to determine the effectiveness of the echo cancellation node 39. If the power of the residue signals is a predetermined amount less than the power of unmodified far end signals, it indicates that the adaptive filter 34 has closely approximated the acoustic path of the echo. The cancellation monitor then inhibits the servo circuit of the filter. Since the echo path, which is through the network, is unlikely to vary during the conversation, the adaptive filter remains "frozen" throughout much of the remainder of the conversation. Accordingly, noise attributable to the adaptation of the filter, which is otherwise included in the residue signal, is eliminated. The cancellation monitor 42 continues to monitor the power levels of the signals during periods of near end speech, in case the associated echo path should change. The noise attributable to the continuous adaptation of the filter is thus avoided, without adversely affecting echo cancellation.

Optional normalizers 22a and 34a may be included in the system, so that the associated adaptive filters 22 and 34 respond quickly to both large and small error signals.

The double echo cancelling systems described above provide echo cancellation without disruption of the conversation. The systems include comparators which monitor both unmodified and modified signals to determine if the callers at the near end, the far end, both ends or neither end are speaking. Based on these determinations, the system operates adaptive filters and attenuators to promote communication between the near end user and the far end caller, while avoiding disruptions in the conversation, particularly during periods of double talk.

The adaptive filters use as reference signals the same signals that are sent to the network transmit circuitry and to the loudspeaker, respectively. In this way the filters adapt to the signals from which the echoes are produced, rather than versions of the signals which are subjected, before transmission, to further modification, such as variable attenuation. The filters can thus produce echo cancellation signals which closely approximate the echoes.

The cancellation monitor included in a preferred embodiment further enhances the performance of the system by controlling the servo circuit of the adaptive filter associated with echoes produced from near end speech signals. Once the adaptive filter has adequately approximated the echo path, which is through network circuitry, the filter typically does not require further adaptation since the echo path does not vary. By freezing this filter, the system avoids adding to residue signals noise attributable to continuous adaptation of the filter, as the associated servo circuit attempts to bring the residue closer and closer to zero.

The foregoing description has been limited to two specific embodiments of the invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A double echo cancellation system for a hands-free terminal including a microphone and a loudspeaker, the terminal receiving far end speech signals over a network and broadcasting associated signals over the loudspeaker, and transmitting over the network signals associated with near end speech signals generated by the microphone, the system including:
   A. a first comparator for comparing near end signals and modified far end signals, the first comparator producing a signal indicating that near end speech is present when the near end signals exceed the modified far end signals by more than a predetermined amount;
   B. a second comparator for comparing far end signals and modified near end signals, the second comparator producing a signal indicating far end speech is present when the far end signals exceed the modified near end signals by more than a predetermined amount;
   C. signal processing means, for processing the near end signals and the far end signals to produce the modified near end and the modified far end signals, the signal processing means including:
      i. first echo cancellation means for processing the near end signals to remove from them signals associated with echoes of far end signals;
      ii. a second echo cancellation means for processing the far end signals to remove from them signals associated with echoes of near end signals;
      iii. a first attenuator for attenuating signals associated with the near end signals;
      iv. a second attenuator for attenuating signals associated with the far end signals; and
   D. an attenuator controller for receiving signals from the first and second comparators and controlling the gain of the first and second attenuators to promote transmission of speech signals and suppression of the echoes, the attenuator controller including:
      i. first adjustment means for adjusting the gain of the first attenuator, the first adjustment means reducing the gain of the first attenuator when the second comparator determines that far end speech is present and the first comparator determines that near end speech is not present;
      ii. second adjustment means for adjusting the gain of the second attenuator, the second adjustment means reducing the gain of the second attenuator when the first comparator determines that near end speech is present and the second comparator determines far end speech is not present;
      iii. the attenuation controller further controlling the first and second adjustment means to
         a. reduce the gains of both of the first and the second attenuator when neither of the first and the second comparators determine speech is present; and
         b. refrain from adjusting the gain of either of the attenuators if both of the first and the second comparators determine that speech is present.

2. The double echo cancelling system of claim 1, wherein
   a. the first echo cancellation means includes
      i. a first adaptive filter for receiving the modified far end signals and producing corresponding far end echo cancellation signals, and
      ii. a first subtraction circuit for subtracting the far end echo cancellation signals from the near end signals,
      iii. first control means for adjusting the first adaptive filter based on signals produced by the first subtraction means, and
      iv. means for inhibiting the control means when the first comparator detects near end speech;
   b. the second echo cancellation means includes
      i. a second adaptive filter for receiving the modified near end signals and producing corresponding near end echo cancellation signals, and
      ii. a second subtraction circuit for subtracting the near end echo cancellation signals from the far end signals,
      iii. second control means for adjusting the second adaptive filter based on signals produced by the second subtraction means, and
      iv. means for inhibiting the second control means when the second comparator detects far end speech.

3. A double echo cancellation system for a hands-free terminal which receives far end signals over a network and near end signals produced by a microphone, the system including:
   A. first echo cancellation means, including
      i. a first adaptive filter for receiving modified far end signals and producing corresponding far end echo cancellation signals, and
      ii. a first subtraction circuit for subtracting the far end echo cancellation signals from the near end signals to produce near end residue signals, and
      iii. first control means for receiving the near end residue signals and adjusting the first adaptive filter if the near end residue signals are not equal to zero,
   B. second echo cancellation means, including
      i. a second adaptive filter for receiving modified near end signals and producing corresponding near end echo cancellation signals,
      ii. a second subtraction circuit for subtracting the near end echo cancellation signals from the far end signals to produce far end residue signals, and
      iii. second control means for receiving the far end residue signals and adjusting the second adaptive filter if the far end residue signals are not equal to zero;
   C. a cancellation monitor for monitoring the second echo cancellation means, the cancellation monitor comparing the power of the far end signals and the power of the far end residue signals, the cancellation monitor enabling the second control means when the power of the far end residue signals exceeds a predetermined percentage of the power of the far end signals and otherwise inhibiting the second control means; and
   D. detecting means for detecting near end speech, the detecting means disabling the first control means and enabling the cancellation monitor when near end speech is detected and enabling the first control means and disabling the cancellation monitor when near end speech is not detected.

4. The double echo cancellation system of claim 3, wherein the detecting means comprises a first comparator for comparing near end signals and modified far end signals, the comparator producing a signal indicating that near end speech is present when the near end signals exceed the modified far end signals by more than a predetermined amount.

5. The double echo cancelling system of claim 4, further including:
   E. a first attenuator for attenuating signals associated with the near end signals to produce modified near end signals;
   F. a second attenuator for attenuating signals associated with the far end signals to produce modified far end signals;
   G. a second comparator for comparing far end signals and modified near end signals, the second comparator producing a signal indicating far end speech is present when the far end signals exceed the modified near end signals by more than a predetermined amount;
   H. an attenuator controller for receiving signals from the first and second comparators and controlling the gain of the first and second attenuators.

6. The double echo cancelling system of claim 5, wherein the attenuator controller includes:
   i. first adjustment means for adjusting the gain of the first attenuator, the first adjustment means reducing the gain of the first attenuator when the second comparator determines that far end speech is present and the first comparator determines that near end speech is not present;
   ii. second adjustment means for adjusting the gain of the second attenuator, the second adjustment means reducing the gain of the second attenuator when the first comparator determines that near end speech is present and the second comparator determines far end speech is not present;
   iii. the attenuator controller further controlling the first and the second adjustment means to
      a. reduce the gains of both of the first and the second attenuators when neither of the first and the second comparators determined speech is present; and
      b. refrain from adjusting the gains of either of the attenuators if both the first and the second comparators determine that speech is present.

7. A double echo cancellation system for a hands-free telephone which includes a loudspeaker for broadcasting signals associated with far end speech signals received from a network and a microphone for producing near end speech signals for transmission to the network, the system including:
   A. first comparator for comparing near end signals and modified far end signals directed to the loudspeaker, the first comparator producing a signal indicating near end speech when the near end signals exceed the modified far end signals by more than a predetermined amount;
   B. a second comparator for comparing far end signals and modified near end signals, the second comparator producing a signal indicating far end speech is present when the far end signals exceed the modified near end signals by more than a predetermined amount;
   C. first echo cancellation means, including
      i. a first adaptive filter for receiving the modified far end signals and producing corresponding far end echo cancellation signals, and
      ii. a first subtraction circuit for subtracting the far end echo cancellation signals from the near end signals to produce near end residue signals, and
      iii. first control means for receiving the near end residue signals and adjusting the first adaptive filter if the near end residue signals are not equal to zero, and
      iv. means for inhibiting the first control means, said means inhibiting the first control means in response to the receipt of a signal from the first comparator indicating near end speech is present;
   D. second echo cancellation means, including
      i. a second adaptive filter for receiving the modified near end signals and producing corresponding near end echo cancellation signals, and
      ii. a second subtraction circuit for subtracting the near end echo cancellation signals from the far end signals to produce far end residue signals, and
      iii. second control means for receiving the far end residue signals and adjusting the second adaptive filter if the far end residue signals are not equal to zero, and
   E. a cancellation monitor for monitoring the second echo cancellation means, the cancellation monitor comparing the power of the far end signals and the power of the far end residue signals, the cancellation monitor enabling the second control means when the power of the far end residue signals exceeds a predetermined percentage of the power of the far end signals by, and otherwise inhibiting the second control means, wherein the first comparator enables the cancellation monitor when near end speech is detected and disables the cancellation monitor when near end speech is not detected;
   F. a first attenuator for attenuating modified near end signals;
   G. a second attenuator for attenuating modified far end signals; and
   H. an attenuator controller for receiving signals from the first and second comparators and controlling the gain of the first and second attenuators by
      i. reducing the gain of the first attenuator when the second comparator determines that far end speech is present and the first comparator determines that near end speech is not present;
      ii. reducing the gain of the second attenuator when the first comparator determines that near end speech is present and the second comparator determines far end speech is not present;
      iii. reducing the gains of both of the first and the second attenuator when neither of the first and the second comparators determine speech is present; and
      iv. refraining from adjusting the gain of either the attenuators if both the first and the second comparators determine that speech is present.

* * * * *